US012630789B2

(12) United States Patent
Silvernail et al.

(10) Patent No.: US 12,630,789 B2
(45) **Date of Patent: *May 19, 2026**

(54) DETERGENT COMPOSITION COMPRISING PHOSPHINOSUCCINIC ACID ADDUCTS AND METHODS OF USE

(71) Applicant: ECOLAB USA INC., Saint Paul, MN (US)

(72) Inventors: Carter M. Silvernail, Saint Paul, MN (US); Erik C. Olson, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/527,692

(22) Filed: Dec. 4, 2023

(65) Prior Publication Data

US 2024/0101932 A1 Mar. 28, 2024

Related U.S. Application Data

(63) Continuation of application No. 17/301,706, filed on Apr. 12, 2021, now Pat. No. 11,952,556, which is a continuation of application No. 16/452,662, filed on Jun. 26, 2019, now Pat. No. 11,001,784, which is a continuation of application No. 15/581,156, filed on Apr. 28, 2017, now Pat. No. 10,377,971, which is a continuation of application No. 14/479,489, filed on Sep. 8, 2014, now Pat. No. 9,670,434, which is a continuation of application No. 13/614,020, filed on Sep. 13, 2012, now Pat. No. 8,871,699.

(51) Int. Cl.

| | |
|---|---|
| ***C11D 3/36*** | (2006.01) |
| ***C11D 3/04*** | (2006.01) |
| ***C11D 3/08*** | (2006.01) |
| ***C11D 3/10*** | (2006.01) |
| ***C11D 3/20*** | (2006.01) |

(52) U.S. Cl.

CPC .............. *C11D 3/365* (2013.01); *C11D 3/044* (2013.01); *C11D 3/08* (2013.01); *C11D 3/10* (2013.01); *C11D 3/2082* (2013.01); *C11D 2111/16* (2024.01); *C11D 2111/18* (2024.01)

(58) Field of Classification Search

None

See application file for complete search history.

(56) References Cited

U.S. PATENT DOCUMENTS

| | | | |
|---|---|---|---|
| 2,012,021 | A | 8/1935 | Petersen |
| 3,620,786 | A | 11/1971 | Hatch |
| 3,874,927 | A | 4/1975 | Willard, Sr. |
| 3,890,350 | A | 6/1975 | Hardtmann |
| 3,908,680 | A | 9/1975 | Krezanoski |
| 3,910,880 | A | 10/1975 | Lamberti |
| 3,959,168 | A | 5/1976 | Germscheid et al. |
| 4,017,410 | A | 4/1977 | Sorgenfrei et al. |
| 4,190,551 | A | 2/1980 | Murata et al. |
| 4,536,313 | A | 8/1985 | Hignett et al. |
| 4,618,444 | A | 10/1986 | Hudson et al. |
| 4,632,741 | A | 12/1986 | Wolf et al. |
| 4,704,404 | A | 11/1987 | Sanderson |
| 4,732,694 | A | 3/1988 | Gowland et al. |
| 4,772,290 | A | 9/1988 | Mitchell et al. |
| 4,783,278 | A | 11/1988 | Sanderson |
| 4,830,766 | A | 5/1989 | Gallup et al. |
| 4,935,065 | A | 6/1990 | Bull |
| 5,018,577 | A | 5/1991 | Pardue et al. |
| 5,023,000 | A | 6/1991 | Kneller et al. |
| 5,030,240 | A | 7/1991 | Wiersema et al. |
| 5,085,794 | A | 2/1992 | Kneller et al. |
| 5,122,538 | A | 6/1992 | Lokkesmoe et al. |
| 5,246,620 | A | 9/1993 | Gethoffer et al. |
| 5,266,587 | A | 11/1993 | Sankey et al. |
| 5,279,757 | A | 1/1994 | Gethoffer et al. |
| 5,320,805 | A | 6/1994 | Kramer et al. |
| 5,385,680 | A | 1/1995 | Didier et al. |
| 5,386,038 | A | 1/1995 | Davis et al. |
| 5,454,982 | A | 10/1995 | Murch et al. |
| 5,463,112 | A | 10/1995 | Sankey et al. |
| 5,466,825 | A | 11/1995 | Carr et al. |
| 5,501,814 | A | 3/1996 | Engelskirchen et al. |
| 5,567,444 | A | 10/1996 | Hei et al. |
| 5,578,134 | A | 11/1996 | Lentsch et al. |
| 5,622,708 | A | 4/1997 | Richter et al. |
| 5,674,828 | A | 10/1997 | Knowlton et al. |
| 5,683,724 | A | 11/1997 | Hei et al. |
| 5,686,401 | A | 11/1997 | Willey et al. |
| 5,718,910 | A | 2/1998 | Oakes et al. |
| 5,914,303 | A | 6/1999 | Sankey et al. |
| 5,958,864 | A | 9/1999 | Artiga Gonzalez et al. |

(Continued)

FOREIGN PATENT DOCUMENTS

| | | | |
|---|---|---|---|
| AU | 199911969 | B2 | 4/1999 |
| AU | 200185520 | A1 | 1/2002 |

(Continued)

OTHER PUBLICATIONS

US 7,851,571 B2, 12/2010, Rodrigues et al. (withdrawn)

(Continued)

*Primary Examiner* — Lorna M Douyon

(74) *Attorney, Agent, or Firm* — McKee, Voorhees & Sease, PLC

(57) ABSTRACT

Detergent compositions effective for controlling hard water scale accumulation are disclosed. Detergent compositions employing phosphinosuccinic acid and mono-, bis- and oligomeric phosphinosuccinic acid (PSO) derivatives with alkali metal carbonate and/or alkali metal hydroxide reduce hard water scale accumulation on treated surfaces at alkaline conditions between about pH of 9 and 12.5. Methods employing the detergent compositions and preventing hard water scale accumulation are also provided.

19 Claims, 1 Drawing Sheet

(56) References Cited

U.S. PATENT DOCUMENTS

| | | | | |
|---|---|---|---|---|
| 5,968,881 | A | 10/1999 | Haeggberg et al. | |
| 5,977,053 | A | 11/1999 | Groth et al. | |
| 6,024,986 | A | 2/2000 | Hei | |
| 6,028,104 | A | 2/2000 | Schmidt et al. | |
| 6,160,110 | A | 12/2000 | Thomaides et al. | |
| 6,177,392 | B1 | 1/2001 | Lentsch et al. | |
| 6,197,739 | B1 | 3/2001 | Oakes et al. | |
| 6,197,897 | B1 | 3/2001 | Mazo et al. | |
| 6,204,234 | B1 | 3/2001 | Herbots et al. | |
| 6,204,238 | B1 | 3/2001 | Oftring et al. | |
| 6,238,685 | B1 | 5/2001 | Hei et al. | |
| 6,262,013 | B1 | 7/2001 | Smith et al. | |
| 6,271,190 | B1 | 8/2001 | Boskamp et al. | |
| 6,277,152 | B1 | 8/2001 | Kyriazis et al. | |
| 6,277,344 | B1 | 8/2001 | Hei et al. | |
| 6,302,968 | B1 | 10/2001 | Baum et al. | |
| 6,303,556 | B1 | 10/2001 | Kott et al. | |
| 6,310,025 | B1 | 10/2001 | Del Duca et al. | |
| 6,326,032 | B1 | 12/2001 | Richter et al. | |
| 6,342,472 | B1 | 1/2002 | Legel et al. | |
| 6,369,021 | B1 | 4/2002 | Man et al. | |
| 6,380,145 | B1 | 4/2002 | Herbots et al. | |
| 6,403,028 | B1 | 6/2002 | Colby et al. | |
| 6,417,151 | B1 | 7/2002 | Grothus et al. | |
| 6,436,445 | B1 | 8/2002 | Hei et al. | |
| 6,468,955 | B1 | 10/2002 | Smets et al. | |
| 6,479,454 | B1 | 11/2002 | Smith et al. | |
| 6,492,316 | B1 | 12/2002 | Herbots et al. | |
| 6,495,357 | B1 | 12/2002 | Fuglsang et al. | |
| 6,506,737 | B1 | 1/2003 | Hei | |
| 6,534,075 | B1 | 3/2003 | Hei et al. | |
| 6,541,436 | B1 | 4/2003 | Arvanitidou et al. | |
| 6,548,467 | B2 | 4/2003 | Baker | |
| 6,572,789 | B1 | 6/2003 | Yang et al. | |
| 6,619,051 | B1 | 9/2003 | Kilawee et al. | |
| 6,624,133 | B1 | 9/2003 | McKenzi et al. | |
| 6,627,593 | B2 | 9/2003 | Hei et al. | |
| 6,627,657 | B1 | 9/2003 | Hilgren et al. | |
| 6,635,286 | B2 | 10/2003 | Hei et al. | |
| 6,693,069 | B2 | 2/2004 | Körber et al. | |
| 6,703,357 | B1 | 3/2004 | Maurer et al. | |
| 6,718,991 | B1 | 4/2004 | Breyer et al. | |
| 6,808,729 | B1 | 10/2004 | Roselle et al. | |
| 6,828,294 | B2 | 12/2004 | Kellar et al. | |
| 6,855,328 | B2 | 2/2005 | Hei et al. | |
| 6,866,888 | B2 | 3/2005 | Baker et al. | |
| 6,897,193 | B2 | 5/2005 | Kischkel et al. | |
| 6,903,064 | B1 | 6/2005 | Kasturi et al. | |
| 6,962,714 | B2 | 11/2005 | Hei et al. | |
| 6,964,787 | B2 | 11/2005 | Swart et al. | |
| 6,964,943 | B1 | 11/2005 | Bettiol et al. | |
| 6,982,241 | B2 | 1/2006 | Smith et al. | |
| 7,008,913 | B2 | 3/2006 | Hei et al. | |
| 7,056,536 | B2 | 6/2006 | Richter et al. | |
| 7,060,301 | B2 | 6/2006 | Wei et al. | |
| 7,074,749 | B2 | 7/2006 | Tropsch et al. | |
| 7,129,076 | B2 | 10/2006 | Poulose et al. | |
| 7,141,125 | B2 | 11/2006 | McKechnie et al. | |
| 7,153,817 | B2 | 12/2006 | Binder | |
| 7,179,778 | B2 | 2/2007 | Weber | |
| 7,226,898 | B2 | 6/2007 | Bragulla | |
| 7,250,159 | B1 | 7/2007 | Arnaud | |
| 7,320,887 | B2 | 1/2008 | Kottwitz et al. | |
| 7,323,438 | B2 | 1/2008 | Hedges et al. | |
| 7,438,767 | B2 | 10/2008 | Mckechnie | |
| 7,448,556 | B2 | 11/2008 | Muehlhausen et al. | |
| 7,462,375 | B2 | 12/2008 | Ge | |
| 7,470,655 | B2 | 12/2008 | Biering et al. | |
| 7,501,388 | B2 | 3/2009 | McClung | |
| 7,510,859 | B2 | 3/2009 | Wieland et al. | |
| 7,517,847 | B2 | 4/2009 | Catalfamo et al. | |
| 7,611,882 | B2 | 11/2009 | Bjornvad et al. | |
| 7,659,354 | B2 | 2/2010 | Song et al. | |
| 7,682,403 | B2 | 3/2010 | Gohl et al. | |
| 7,727,946 | B2 | 6/2010 | Catalfamo et al. | |
| 7,749,334 | B2 | 7/2010 | Biering et al. | |
| 7,754,670 | B2 | 7/2010 | Lange et al. | |
| 7,754,671 | B2 | 7/2010 | Lin et al. | |
| 7,816,555 | B2 | 10/2010 | Smith et al. | |
| 7,892,536 | B2 | 2/2011 | Kelemen et al. | |
| 7,910,647 | B2 | 3/2011 | Weide et al. | |
| 7,915,212 | B2 | 3/2011 | Yeung et al. | |
| 7,928,049 | B2 | 4/2011 | Wagner et al. | |
| 7,939,485 | B2 | 5/2011 | Price et al. | |
| 7,985,570 | B2 | 7/2011 | Wieland et al. | |
| 7,994,251 | B2 | 8/2011 | Rogmann et al. | |
| 8,012,267 | B2 | 9/2011 | Jekel et al. | |
| 8,022,027 | B2 | 9/2011 | Souter et al. | |
| 8,043,650 | B2 | 10/2011 | Gutzmann et al. | |
| 8,058,374 | B2 | 11/2011 | Rodrigues et al. | |
| 8,063,008 | B2 | 11/2011 | Dicosimo et al. | |
| 8,119,588 | B2 | 2/2012 | Bernhardt et al. | |
| 8,124,132 | B2 | 2/2012 | Hilgren et al. | |
| 8,178,352 | B2 | 5/2012 | Tokhtuev et al. | |
| 8,202,830 | B2 | 6/2012 | Miralles et al. | |
| 8,222,196 | B2 | 7/2012 | Smith et al. | |
| 8,246,906 | B2 | 8/2012 | Hei et al. | |
| 8,247,363 | B2 | 8/2012 | Fernholz et al. | |
| 8,748,365 | B2 | 6/2014 | Olson et al. | |
| 8,784,790 | B2 | 7/2014 | Myntti et al. | |
| 8,871,699 | B2 | 10/2014 | Silvernail et al. | |
| 8,940,676 | B2 | 1/2015 | Catlin et al. | |
| 8,999,399 | B2 | 4/2015 | Lisowsky et al. | |
| 9,018,142 | B2 | 4/2015 | Rovison, Jr. et al. | |
| 9,023,779 | B2 | 5/2015 | Miralles | |
| 9,023,784 | B2 | 5/2015 | Silvernail et al. | |
| 9,051,285 | B2 | 6/2015 | Rohwer et al. | |
| 9,255,242 | B2 | 2/2016 | Olson et al. | |
| 9,670,434 | B2 | 6/2017 | Silvernail et al. | |
| 9,752,105 | B2 | 9/2017 | Stokes et al. | |
| 9,994,799 | B2 | 6/2018 | Silvernail et al. | |
| 10,358,622 | B2 | 7/2019 | Stokes et al. | |
| 10,377,971 | B2 | 8/2019 | Silvernail et al. | |
| 11,001,784 | B2 | 5/2021 | Silvernail et al. | |
| 11,053,458 | B2 | 7/2021 | Silvernail et al. | |
| 11,859,155 | B2 | 1/2024 | Silvernail et al. | |
| 11,952,556 | B2 * | 4/2024 | Silvernail .............. | C11D 3/365 |
| 12,371,639 | B2 * | 7/2025 | Silvernail .............. | C11D 3/044 |
| 2002/0013252 | A1 | 1/2002 | Schmiedel et al. | |
| 2002/0037824 | A1 | 3/2002 | Smets | |
| 2002/0082181 | A1 | 6/2002 | Humphrey et al. | |
| 2002/0086903 | A1 | 7/2002 | Giambrone et al. | |
| 2002/0128312 | A1 | 9/2002 | Hei et al. | |
| 2002/0159917 | A1 | 10/2002 | Swart | |
| 2002/0160930 | A1 | 10/2002 | Emmerson | |
| 2002/0177541 | A1 | 11/2002 | Tarara et al. | |
| 2002/0192340 | A1 | 12/2002 | Swart et al. | |
| 2003/0139310 | A1 | 7/2003 | Smith et al. | |
| 2003/0141258 | A1 | 7/2003 | Hatch | |
| 2003/0166848 | A1 | 9/2003 | Kingma et al. | |
| 2003/0191040 | A1 | 10/2003 | Adriaanse et al. | |
| 2003/0194433 | A1 | 10/2003 | Hei et al. | |
| 2004/0146426 | A1 | 7/2004 | Biering et al. | |
| 2004/0194810 | A1 | 10/2004 | Strothoff et al. | |
| 2004/0259755 | A1 | 12/2004 | Orlich et al. | |
| 2005/0003979 | A1 | 1/2005 | Lentsch et al. | |
| 2005/0020464 | A1 | 1/2005 | Smith et al. | |
| 2005/0086757 | A1 | 4/2005 | Lann | |
| 2005/0137105 | A1 | 6/2005 | Griese et al. | |
| 2005/0245411 | A1 | 11/2005 | Yang et al. | |
| 2005/0282261 | A1 | 12/2005 | Sauter et al. | |
| 2006/0003028 | A1 | 1/2006 | Myers et al. | |
| 2006/0069003 | A1 | 3/2006 | Song et al. | |
| 2006/0069004 | A1 | 3/2006 | Song et al. | |
| 2006/0113506 | A1 | 6/2006 | Man et al. | |
| 2006/0118141 | A1 | 6/2006 | Andriola et al. | |
| 2006/0122090 | A1 | 6/2006 | Spanier et al. | |
| 2006/0134239 | A1 | 6/2006 | Weide et al. | |
| 2006/0247144 | A1 | 11/2006 | Geret | |
| 2006/0270580 | A1 | 11/2006 | Smith et al. | |
| 2007/0020364 | A1 | 1/2007 | Burnett et al. | |
| 2007/0084650 | A1 | 4/2007 | Schwei et al. | |
| 2007/0102030 | A1 | 5/2007 | Young | |
| 2007/0111922 | A1 | 5/2007 | Tamura | |

(56) References Cited

U.S. PATENT DOCUMENTS

| | | | |
|---|---|---|---|
| 2007/0125987 | A1 | 6/2007 | Hills et al. |
| 2007/0128129 | A1 | 6/2007 | Stehr et al. |
| 2007/0155835 | A1 | 7/2007 | Weide et al. |
| 2007/0173428 | A1 | 7/2007 | Appleby et al. |
| 2007/0190177 | A1 | 8/2007 | Kling et al. |
| 2008/0014284 | A1 | 1/2008 | Meyer et al. |
| 2008/0026026 | A1 | 1/2008 | Lu et al. |
| 2008/0076692 | A1 | 3/2008 | Carvell et al. |
| 2008/0118580 | A1 | 5/2008 | Bockmuhl et al. |
| 2008/0169243 | A1 | 7/2008 | Dave et al. |
| 2008/0261851 | A1 | 10/2008 | Barthel et al. |
| 2008/0263778 | A1 | 10/2008 | Baars et al. |
| 2008/0271760 | A1 | 11/2008 | Housmekerides |
| 2008/0274930 | A1 | 11/2008 | Smith et al. |
| 2009/0061017 | A1 | 3/2009 | Pedersen et al. |
| 2009/0101587 | A1 | 4/2009 | Blokker et al. |
| 2009/0288683 | A1 | 11/2009 | Cummings et al. |
| 2009/0325841 | A1 | 12/2009 | Erickson et al. |
| 2010/0075883 | A1 | 3/2010 | Geret et al. |
| 2010/0093587 | A1 | 4/2010 | Preuschen et al. |
| 2010/0116473 | A1 | 5/2010 | Yang et al. |
| 2010/0144958 | A1 | 6/2010 | Findlay et al. |
| 2010/0189707 | A1 | 7/2010 | Barnett |
| 2010/0300044 | A1 | 12/2010 | Man et al. |
| 2010/0330013 | A1 | 12/2010 | O'Connell et al. |
| 2011/0021410 | A1 | 1/2011 | Miralles et al. |
| 2011/0165261 | A1 | 7/2011 | Derby et al. |
| 2011/0177046 | A1 | 7/2011 | Cahill et al. |
| 2011/0182959 | A1 | 7/2011 | Cahill et al. |
| 2011/0253628 | A1 | 10/2011 | Blokker et al. |
| 2011/0308553 | A1 | 12/2011 | Strothoff et al. |
| 2012/0014751 | A1 | 1/2012 | Baugh et al. |
| 2012/0046216 | A1 | 2/2012 | Hodge et al. |
| 2012/0121679 | A1 | 5/2012 | Cannon et al. |
| 2012/0128614 | A1 | 5/2012 | Rieth et al. |
| 2012/0165237 | A1 | 6/2012 | Silvernail |
| 2012/0208734 | A1 | 8/2012 | Eiting et al. |
| 2012/0291820 | A1 | 11/2012 | Strothoff et al. |
| 2014/0073550 | A1 | 3/2014 | Olson et al. |

FOREIGN PATENT DOCUMENTS

| | | | |
|---|---|---|---|
| CA | 2122136 | A1 | 4/1993 |
| CA | 2163757 | C | 12/1994 |
| CA | 2314648 | A1 | 1/2001 |
| CA | 2314660 | A1 | 1/2001 |
| CA | 2448548 | A1 | 12/2002 |
| CA | 2450893 | A1 | 1/2003 |
| CA | 2531098 | A1 | 1/2005 |
| CA | 2567210 | A1 | 2/2006 |
| CN | 101622199 | A | 1/2010 |
| CN | 101228192 | B | 5/2011 |
| CN | 102844125 | A | 12/2012 |
| DE | 4324202 | A1 | 12/1994 |
| DE | 19639603 | A1 | 9/1996 |
| DE | 19754290 | A1 | 6/1999 |
| DE | 19906660 | A1 | 1/2000 |
| DE | 19949980 | A1 | 4/2001 |
| DE | 10127919 | A1 | 12/2002 |
| EP | 0096566 | A1 | 12/1983 |
| EP | 0133354 | A1 | 2/1985 |
| EP | 0256148 | A1 | 2/1988 |
| EP | 0383214 | A1 | 8/1990 |
| EP | 491391 | A1 | 12/1991 |
| EP | 0511081 | A1 | 10/1992 |
| EP | 0511091 | A1 | 10/1992 |
| EP | 0609273 | A1 | 8/1994 |
| EP | 9612843 | A1 | 8/1994 |
| EP | 0658594 | B1 | 6/1995 |
| EP | 0691398 | A1 | 1/1996 |
| EP | 0976867 | B1 | 2/2000 |
| EP | 1063281 | A2 | 12/2000 |
| EP | 1065261 | A2 | 1/2001 |
| EP | 1127939 | A1 | 8/2001 |
| EP | 1138335 | A1 | 10/2001 |
| EP | 1260234 | A1 | 11/2002 |
| EP | 1293215 | A1 | 3/2003 |
| EP | 1302108 | A2 | 4/2003 |
| EP | 1451243 | B9 | 9/2004 |
| EP | 1477552 | A1 | 11/2004 |
| GB | 1148046 | | 4/1969 |
| GB | 1222911 | A | 2/1971 |
| GB | 1351977 | | 5/1974 |
| GB | 1571357 | | 7/1980 |
| GB | 2427614 | | 1/2007 |
| IN | 226322 | | 3/2005 |
| IN | 212385 | | 4/2005 |
| IN | 200300222 | | 4/2005 |
| IN | 200000442 | | 4/2007 |
| IN | 200502145 | | 8/2007 |
| IN | 200902559 | | 12/2009 |
| IN | 201205604 | | 3/2014 |
| IN | 201301987 | | 9/2014 |
| IN | 201211025 | | 10/2014 |
| IN | 201401913 | | 3/2015 |
| IN | 201402010 | | 3/2015 |
| JP | 60228683 | A | 11/1985 |
| JP | 6112878 | A | 1/1986 |
| JP | 7330994 | A | 12/1995 |
| JP | 1150096 | A | 2/1999 |
| JP | 1161177 | A | 3/1999 |
| JP | 1161178 | A | 3/1999 |
| JP | 1161179 | A | 3/1999 |
| JP | 1161180 | A | 3/1999 |
| JP | 1161181 | A | 3/1999 |
| JP | 1161183 | A | 3/1999 |
| JP | 1161185 | A | 3/1999 |
| JP | 2001508110 | A | 6/2001 |
| JP | 3370571 | B2 | 11/2002 |
| JP | 2004532351 | A | 10/2004 |
| JP | 4851093 | B2 | 3/2006 |
| JP | 2006265469 | A | 10/2006 |
| JP | 2007246432 | A | 9/2007 |
| JP | 2008540732 | A | 11/2008 |
| JP | 2010515569 | A | 5/2010 |
| JP | 2010144087 | A | 7/2010 |
| JP | 2012507627 | A | 3/2012 |
| JP | 5036962 | B2 | 9/2012 |
| JP | 2013129808 | A | 7/2013 |
| JP | 2013158743 | A | 8/2013 |
| KR | 2006046896 | A | 5/2006 |
| KR | 20080099255 | A | 11/2008 |
| MX | 329088 | A | 3/2015 |
| WO | 199007501 | A1 | 7/1990 |
| WO | 9202309 | A1 | 2/1992 |
| WO | 9407982 | A1 | 4/1994 |
| WO | 199418299 | A1 | 8/1994 |
| WO | 9423000 | A1 | 10/1994 |
| WO | 199521290 | A1 | 8/1995 |
| WO | 9526392 | A1 | 10/1995 |
| WO | 9526393 | A1 | 10/1995 |
| WO | 9617920 | A1 | 6/1996 |
| WO | 9722651 | A1 | 6/1997 |
| WO | 9731999 | A1 | 9/1997 |
| WO | 9805749 | A1 | 2/1998 |
| WO | 9815607 | A1 | 4/1998 |
| WO | 9815608 | A1 | 4/1998 |
| WO | 9856760 | A1 | 12/1998 |
| WO | 9903962 | A1 | 1/1999 |
| WO | 9910466 | A1 | 3/1999 |
| WO | 9914304 | A1 | 3/1999 |
| WO | 9919449 | A1 | 4/1999 |
| WO | 9920729 | A1 | 4/1999 |
| WO | 199920726 | A1 | 4/1999 |
| WO | 9941350 | A1 | 8/1999 |
| WO | 9941351 | A1 | 8/1999 |
| WO | 0037041 | A1 | 6/2000 |
| WO | 0060042 | A1 | 10/2000 |
| WO | 0061715 | A1 | 10/2000 |
| WO | 0071651 | A2 | 11/2000 |
| WO | 200066810 | A1 | 11/2000 |
| WO | 0102528 | A1 | 1/2001 |
| WO | 0102529 | A1 | 1/2001 |
| WO | 0107551 | A1 | 2/2001 |

(56) References Cited

FOREIGN PATENT DOCUMENTS

| | | | |
|---|---|---|---|
| WO | 0107560 | A1 | 2/2001 |
| WO | 0136579 | A1 | 5/2001 |
| WO | 0138471 | A1 | 5/2001 |
| WO | 0146358 | A2 | 6/2001 |
| WO | 0176442 | A1 | 10/2001 |
| WO | 0202725 | A1 | 1/2002 |
| WO | 02079105 | A1 | 10/2002 |
| WO | 03004408 | A1 | 1/2003 |
| WO | 03048291 | A1 | 6/2003 |
| WO | 03073849 | A1 | 9/2003 |
| WO | 2004091557 | A2 | 10/2004 |
| WO | 2005083049 | A2 | 9/2005 |
| WO | 2005108644 | A2 | 11/2005 |
| WO | 06105841 | A1 | 10/2006 |
| WO | 06105863 | A1 | 10/2006 |
| WO | 06108490 | A1 | 10/2006 |
| WO | 2006121596 | A1 | 11/2006 |
| WO | 07025603 | A1 | 3/2007 |
| WO | 2008028896 | A2 | 3/2008 |
| WO | 2008035071 | A1 | 3/2008 |
| WO | 2008088975 | A1 | 7/2008 |
| WO | 2008137790 | A2 | 11/2008 |
| WO | 2009112992 | A1 | 9/2009 |
| WO | 09122125 | A1 | 10/2009 |
| WO | 2010000636 | A1 | 1/2010 |
| WO | 2010033746 | A1 | 3/2010 |
| WO | 2010033747 | A1 | 3/2010 |
| WO | 10146543 | A1 | 12/2010 |
| WO | 2011014783 | A1 | 2/2011 |
| WO | 2011024094 | A2 | 3/2011 |
| WO | 11070392 | A1 | 6/2011 |
| WO | 2011089493 | A1 | 7/2011 |
| WO | 2011161459 | A1 | 12/2011 |
| WO | 12014016 | A1 | 2/2012 |
| WO | 12028196 | A1 | 3/2012 |
| WO | 12036702 | A1 | 3/2012 |
| WO | 2012028203 | A1 | 3/2012 |
| WO | 2012042000 | A1 | 4/2012 |
| WO | 12128629 | A1 | 9/2012 |
| WO | 2012155986 | A1 | 11/2012 |
| WO | 2012156369 | A1 | 11/2012 |

OTHER PUBLICATIONS

JP2006-265469, Daisan Kogyo KK,—English Translation, Oct. 5, 2006.

European Patent Office, "Extended Search Report", issued in connection to European Application No. 13837225.5, dated May 13, 2016, 7 pages. May 13, 2016.

CN101228192—Kraton Polymers—English Translation May 25, 2011.

CN102844125—Ecolab USA Inc.—English Translation Dec. 26, 2012.

DE4324202—Henkel Ecolab GMBH & Co.—English Translation Dec. 1, 1994.

DE10127919—Ecolab GMBH & Co.—English Translation Dec. 19, 2002.

DE19906660—Haka Kunz GmbH—English Translation Jan. 27, 2000.

DE19949980—Henkel KGaA—English Translation Apr. 19, 2001.

EP0256148—Jon A. Benckiser—English Translation Feb. 24, 1988.

EP0511081—Roquette Freres—English Translation Oct. 28, 1992.

EP0609273—Henkel Kommanditgesellschaft—English Translation Aug. 10, 1994.

EP0658594—Witco Vinyl Additives GmbH—English Translation Jun. 21, 1995.

EP1451243—Roquette Freres—English Translation Sep. 1, 2004.

JP4851093—Novo Enzyme Akuti Angeles Cub Graphics—English Translation Mar. 23, 2006.

JP7330994—Nippon Synthetic Chemical Industry—English Translation Dec. 19, 1995.

JPS60228683—Mitsubishi Electric—English Translation Nov. 13, 1985.

JPS6112878—Mitsubishi Electric—English Translation Jan. 21, 1986.

WO 94/07982—Henkel Kommanditgesellschaft—English Translation Apr. 14, 1994.

WO 01/46358—Henkel Kommanditgesellschaft—English Translation Jun. 28, 2001.

Ecolab USA Inc, PCT/US2013/058016 filed Sep. 4, 2013 "Notification and Transmittal of The International Search Report and The Written Opinion of the International Searching Authority" mailed Nov. 21, 2013.

Ecolab USA Inc, PCT/US2013/058022 filed Sep. 4, 2013 "Notification and Transmittal of The International Search Report and The Written Opinion of the International Searching Authority" mailed Nov. 21, 2013.

Sasol, "Specialty Ethoxylates based on short chain alcohols", Sasol Performance Chemicals booklet, 20 pages, Sep. 9, 2015.

* cited by examiner

DETERGENT COMPOSITION COMPRISING PHOSPHINOSUCCINIC ACID ADDUCTS AND METHODS OF USE

CROSS REFERENCE TO RELATED APPLICATIONS

This is a continuation application of U.S. Ser. No. 17/301,706, filed Apr. 12, 2021, now U.S. Pat. No. 11,952,556, issued Apr. 9, 2024, which is a continuation of U.S. Ser. No. 16/452,662, filed Jun. 26, 2019, now U.S. Pat. No. 11,001,784, issued May 11, 2021, which is a continuation of U.S. Serial. No. 15/581,156, filed Apr. 28, 2017, now U.S. Pat. No. 10,377,971, issued Aug. 13, 2019, which is a continuation of U.S. Ser. No. 14/479,489, filed Sep. 8, 2014, now U.S. Pat. No. 9,670,434, issued Jun. 6, 2017, which is a continuation of U.S. Ser. No. 13/614,020, filed Sep. 13, 2012, now U.S. Pat. No. 8,871,699, issued Oct. 28, 2014, entitled “DETERGENT COMPOSITION COMPRISING PHOSPHINOSUCCINIC ACID ADDUCTS AND METHODS OF USE.”

FIELD OF THE INVENTION

The invention relates to detergent compositions effective for controlling hard water scale accumulation. In particular, detergent compositions employing mono-, bis- and oligomeric phosphinosuccinic acid (PSO) derivatives and combined with alkali metal carbonate and/or alkali metal hydroxide are provided. Methods employing the detergent compositions and preventing scale accumulation are provided for use in alkaline conditions between about 9 and 12.5.

BACKGROUND OF THE INVENTION

Alkali metal carbonate and/or hydroxide detergents are often referred to as ash detergents and caustic detergents, respectively. Detergent formulations employing alkali metal carbonates and/or alkali metal hydroxides are known to provide effective detergency. Formulations can vary greatly in their degree of corrosiveness, acceptance as consumer-friendly and/or environmentally-friendly products, as well as other detergent characteristics. Generally, as the alkalinity of these detergent compositions increase, the difficulty in preventing hard water scale accumulation also increases. A need therefore exists for detergent compositions that minimize and/or eliminate hard water scale accumulation within systems employing these detergents.

In addition, as the use of phosphorous raw materials in detergents becomes more heavily regulated, industries are seeking alternative ways to control hard water scale formation associated with highly alkaline detergents.

Accordingly, it is an objective of the claimed invention to develop alkaline detergent compositions effective for controlling hard water scale accumulation while maintaining effective detergency.

A further object of the invention is to provide methods for employing alkaline detergents between pHs from about 9 to about 12.5 without causing significant hard water scale accumulation.

A still further object of the invention is to employ mono-, bis- and oligomeric phosphinosuccinic acid (PSO) derivatives and provide efficient detergency.

BRIEF SUMMARY OF THE INVENTION

An advantage of the invention is the prevention of moderate to hard water scale accumulation on treated substrate surfaces through the application of the detergent compositions of the invention. As a result, the aesthetic appearances of the treated substrate surfaces are improved.

In an embodiment, the present invention provides a detergent composition comprising: a phosphinosuccinic acid derivative; and an alkalinity source comprising an alkali metal hydroxide, carbonate, metasilicate and/or silicate wherein a use solution of the detergent composition has a pH between about 9 and 12.5.

In another embodiment, the present invention provides a detergent composition comprising: a phosphinosuccinic acid derivative comprising a phosphinosuccinic acid and mono-, bis- and oligomeric phosphinosuccinic acid adducts; an alkalinity source comprising an alkali metal hydroxide, carbonate, metasilicate and/or silicate; and a surfactant, wherein a use solution of the detergent composition has a pH between about 9 and 12.5.

In a further embodiment, the present invention provides a method of cleaning while preventing hard water scale accumulation on a treated surface comprising: applying a detergent composition to a substrate surface, wherein the detergent composition comprises a phosphinosuccinic acid and an alkalinity source comprising an alkali metal hydroxide, carbonate, carbonate, metasilicate, silicate and/or combinations of the same, wherein the detergent composition is effective for preventing the formation, precipitation and/or deposition of hard water scale on the surface.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

DETAILED DESCRIPTION OF THE PREFERRED EMBODIMENT

Figure 1:
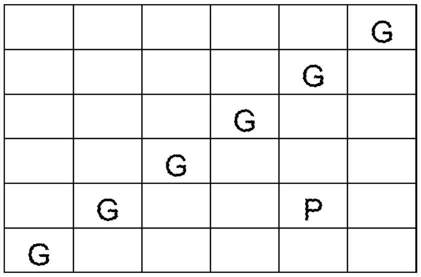
FIG. 1 shows the arrangement of ware in a Raburn rack inside a dishmachine as employed in Example 1.

The present invention relates to detergent compositions employing phosphinosuccinic acid and mono-, bis- and oligomeric phosphinosuccinic acid derivatives with alkali metal carbonate, metasilicate and/or silicate. The detergent compositions have many advantages over conventional alkali metal carbonate and/or alkali metal hydroxide detergents. For example, the detergent compositions provide effective hard water scale accumulation prevention at alkaline conditions from about 9 to about 12.5.

The embodiments of this invention are not limited to particular alkaline detergent compositions, which can vary and are understood by skilled artisans. It is further to be understood that all terminology used herein is for the purpose of describing particular embodiments only, and is not intended to be limiting in any manner or scope. For example, as used in this specification and the appended claims, the singular forms “a,” “an” and “the” can include plural referents unless the content clearly indicates otherwise. Further, all units, prefixes, and symbols may be denoted in its SI accepted form. Numeric ranges recited within the specification are inclusive of the numbers defining the range and include each integer within the defined range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

The term "cleaning," as used herein, refers to performing or aiding in any soil removal, bleaching, microbial population reduction, or combination thereof.

The term "defoamer" or "defoaming agent," as used herein, refers to a composition capable of reducing the stability of foam. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane such as those available under the name Abil B9952; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. Nos. 3,048,548, 3,334,147, and 3,442,242, the disclosures of which are incorporated herein by reference.

The terms "feed water," "dilution water," and "water" as used herein, refer to any source of water that can be used with the methods and compositions of the present invention. Water sources suitable for use in the present invention include a wide variety of both quality and pH, and include but are not limited to, city water, well water, water supplied by a municipal water system, water supplied by a private water system, and/or water directly from the system or well. Water can also include water from a used water reservoir, such as a recycle reservoir used for storage of recycled water, a storage tank, or any combination thereof. Water also includes food process or transport waters. It is to be understood that regardless of the source of incoming water for systems and methods of the invention, the water sources may be further treated within a manufacturing plant. For example, lime may be added for mineral precipitation, carbon filtration may remove odoriferous contaminants, additional chlorine or chlorine dioxide may be used for disinfection or water may be purified through reverse osmosis taking on properties similar to distilled water.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt-%. More preferably, the amount of phosphorus is less than 0.1 wt-%, and most preferably the amount of phosphorus is less than 0.01 wt-%.

For the purpose of this patent application, successful microbial reduction is achieved when the microbial populations are reduced by at least about 50%, or by significantly more than is achieved by a wash with water. Larger reductions in microbial population provide greater levels of protection.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions

According to an embodiment of the invention, alkaline detergents incorporate phosphinosuccinic acid (PSO)

derivatives. In an aspect, the alkaline detergents comprise, consist of and/or consist essentially of phosphinosuccinic acid (PSO) derivatives and a source of organic alkalinity source. The compositions may also include water, surfactants and/or other polymers, and any combination of the same.

An example of a suitable detergent composition for use according to the invention may comprise, consist and/or consist essentially of about 1-90 wt-% alkali metal carbonate and/or hydroxide, from about 10-80 wt-% of the alkalinity source, and preferably about 10-70 wt-% alkali metal carbonate and/or hydroxide; about 0.01-40 wt-% PSO derivative, preferably about 1-20 wt-% PSO derivative; and optionally other chelating agents, polymers and/or surfactants, including for example preferably about 0.1-40 wt-% surfactant, preferably from about 1-10 wt-% of a nonionic surfactant.

An example of a suitable detergent use solution composition for use according to the invention may comprise, consist and/or consist essentially of about from about 100-1500 ppm of an alkalinity source, from about 1-500 ppm phosphinosuccinic acid derivative, from about 1-50 ppm of a nonionic surfactant and has a pH of about 9 and 12.5.

Further description of suitable formulations is shown below:

| Formulations | | | |
|---|---|---|---|
| Water | 0-90 wt-% | 10-50 wt-% | 10-20 wt-% |
| Alkalinity (e.g. sodium hydroxide (beads)) | 1-90 wt-% | 10-70 wt-% | 50-70 wt-% |
| PSO derivatives | 0.01-40 wt-% | 1-20 wt-% | 5-20 wt-% |
| Optional Surfactant(s) | 0-40 wt-% | 0-25 wt-% | 0-10 wt-% |

Use solutions of the detergent compositions have a pH greater than about 9. In further aspects, the pH of the detergent composition use solution is between about 9 and 12.5. In preferred aspects, the pH of the detergent composition use solution is between about 10.5 and 12.5. Beneficially, the detergent compositions of the invention provide effective prevention of hardness scale accumulation on treated surfaces at such alkaline pH conditions. Without being limited to a particular theory of the invention, it is unexpected to have effective cleaning without the accumulation of hardness scaling at alkaline conditions above pH about 9 wherein alkalinity sources (e.g. sodium carbonate and/or sodium hydroxide) are employed.

Phosphinosuccinic Acid (PSO) Derivatives

The detergent compositions employ a phosphinosuccinic acid (PSO) derivative. PSO derivatives may also be described as phosphonic acid-based compositions. In an aspect of the invention, the PSO derivatives are a combination of mono-, bis- and oligomeric phosphinosuccinic acid adducts and a phosphinosuccinic acid (PSA) adduct.

The phosphinosuccinic acid (PSA) adducts have the formula (I) below:

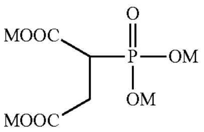

The mono-phosphinosuccinic acid adducts have the formula (II) below:

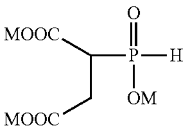

The bis-phosphinosuccinic acid adducts have the formula (III) below:

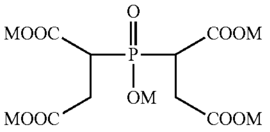

An exemplary structure for the oligomeric phosphinosuccinic acid adducts is shown in formula (IV) below:

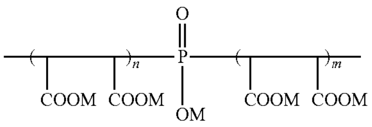

where M is $H^+$, $Na^+$, $K^+$, $NH_4^+$, or mixtures thereof; and the sum of m plus n is greater than 2.

Additional oligomeric phosphinosuccinic acid adduct structures are set forth for example in U.S. Pat. Nos. 5,085,794, 5,023,000 and 5,018,577, each of which are incorporated herein by reference in their entirety. The oligomeric species may also contain esters of phosphinosuccinic acid, where the phosphonate group is esterified with a succinate-derived alkyl group. Furthermore, the oligomeric phosphinosuccinic acid adduct may comprise 1-20 wt % of additional monomers selected, including, but not limited to acrylic acid, methacrylic acid, itaconic acid, 2-acylamido-2-methylpropane sulfonic acid (AMPS), and acrylamide.

The adducts of formula I, II, III and IV may be used in the acid or salt form. Further, in addition to the phosphinosuccinic acids and oligomeric species, the mixture may also contain some phosphinosuccinic acid derivative (I) from the oxidation of adduct II, as well as impurities such as various inorganic phosphorous byproducts of formula $H_2PO_{2-}$, $HPO_3^{2-}$ and $PO_4^{3-}$.

In an aspect, the mono-, bis- and oligomeric phosphinosuccinic acid adducts and the phosphinosuccinic acid (PSA) may be provided in the following mole and weight ratios.

| Species: | Mono | PSA | Bis | Oligomer |
|---|---|---|---|---|
| Formula | $C_4H_7PO_6$ | $C_4H_7PO_7$ | $C_8H_{11}PO_{10}$ | $C_{14.1}H_{17.1}PO_{16.1}$ |
| MW | 182 | 198 | 298 | 475.5(ave) |
| Mole fraction (by NMR) | 0.238 | 0.027 | 0.422 | 0.309 |
| Wt. Fraction (as acid) | 0.135 | 0.017 | 0.391 | 0.457 |

Detergent compositions and methods of use may employ the phosphinosuccinic acid derivative and may include one or more of PSO derivatives selected from mono-, bis- and oligomeric phosphinosuccinic acid and a phosphinosuccinic acid, wherein at least about 10 mol % of the derivative comprises a succinic acid:phosphorus ratio of about 1:1 to about 20:1. More preferably, the phosphinosuccinic acid derivative may include one or more of the PSO derivatives selected from mono-, bis- and oligomeric phosphinosuccinic acid and optionally a phosphinosuccinic acid wherein at least about 10 mol % of the derivative comprises a succinic acid:phosphorus ratio of about 1:1 to about 15:1. Most preferably, the phosphinosuccinic acid derivative may include one or more derivatives selected from mono-, bis- and oligomeric phosphinosuccinic acid and optionally a phosphinosuccinic acid wherein at least about 10 mol % of the derivative comprises a succinic acid:phosphorus ratio of about 1:1 to about 10:1.

Additional description of suitable mono-, bis- and oligomeric phosphinosuccinic acid adducts for use as the PSO derivatives of the present invention is provided in U.S. Pat. No. 6,572,789 which is incorporated herein by reference in its entirety.

In aspects of the invention the detergent composition is nitrilotriacetic acid (NTA)-free to meet certain regulations. In additional aspects of the invention the detergent composition is substantially phosphorous free to meet certain regulations. The PSO derivatives of the claimed invention may provide substantially phosphorous free detergent compositions having less than about 0.5 wt-% of phosphorus. More preferably, the amount of phosphorus is a detergent composition may be less than about 0.1 wt-%. Accordingly, it is a benefit of the detergent compositions of the present invention to provide detergent compositions capable of controlling (i.e. preventing) hardness scale accumulation on a substrate surface without the use of phosphates, such as tripolyphosphates, commonly used in detergents to prevent hardness scale and/or accumulation.

Alkalinity Source

According to an embodiment of the invention, the detergent compositions include an alkalinity source. Exemplary alkalinity sources include alkali metal carbonates and/or alkali metal hydroxides.

Alkali metal carbonates used in the formulation of detergents are often referred to as ash-based detergents and most often employ sodium carbonate. Additional alkali metal carbonates include, for example, sodium or potassium carbonate. In aspects of the invention, the alkali metal carbonates are further understood to include metasilicates, silicates, bicarbonates and sesquicarbonates. According to the invention, any "ash-based" or "alkali metal carbonate" shall also be understood to include all alkali metal carbonates, metasilicates, silicates, bicarbonates and/or sesquicarbonates.

Alkali metal hydroxides used in the formulation of detergents are often referred to as caustic detergents. Examples of suitable alkali metal hydroxides include sodium hydroxide, potassium hydroxide, and lithium hydroxide. Exemplary alkali metal salts include sodium carbonate, potassium carbonate, and mixtures thereof. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In addition to the first alkalinity source, the detergent composition may comprise a secondary alkalinity source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkalinity agents are commonly available in either aqueous or powdered form, either of which is useful in formulating the present detergent compositions.

An effective amount of one or more alkalinity sources is provided in the detergent composition. An effective amount is referred to herein as an amount that provides a use composition having a pH of at least about 9, preferably at least about 10. When the use composition has a pH of between about 9 and about 10, it can be considered mildly alkaline, and when the pH is greater than about 12, the use composition can be considered caustic. In some circumstances, the detergent composition may provide a use composition that is useful at pH levels below about 9, such as through increased dilution of the detergent composition.

Additional Functional Ingredients

The components of the detergent composition can be combined with various additional functional ingredients. In some embodiments, the detergent composition including the PSO derivatives and alkalinity source make up a large amount, or even substantially all of the total weight of the detergent composition, for example, in embodiments having few or no additional functional ingredients disposed therein. In these embodiments, the component concentrations ranges provided above for the detergent composition are representative of the ranges of those same components in the detergent composition.

The functional ingredients provide desired properties and functionalities to the detergent composition. For the purpose of this application, the term "functional ingredients" includes an ingredient that when dispersed or dissolved in a use and/or concentrate, such as an aqueous solution, provides a beneficial property in a particular use. Some particular examples of functional ingredients are discussed in more detail below, although the particular materials discussed are given by way of example only, and that a broad variety of other functional ingredients may be used. For example, many of the functional ingredients discussed below relate to materials used in cleaning applications. However, other embodiments may include functional ingredients for use in other applications.

Exemplary additional functional ingredients include for example: builders or water conditioners, including detergent builders; hardening agents; bleaching agents; fillers; defoaming agents; anti-redeposition agents; stabilizing agents; dispersants; enzymes; glass and metal corrosion inhibitors; fragrances and dyes; thickeners; etc. Further description of suitable additional functional ingredients is set forth in U.S. Publication No. US 2012/0165237, which is incorporated herein by reference in its entirety.

Surfactants

In some embodiments, the compositions of the present invention include a surfactant. Surfactants suitable for use with the compositions of the present invention include, but are not limited to, nonionic surfactants, anionic surfactants, cationic surfactants, amphoteric surfactants and/or zwitterionic surfactants.

In some embodiments, the compositions of the present invention include about 0-40 wt-% of a surfactant. In other embodiments the compositions of the present invention include about 0-25 wt-% of a surfactant.

In certain embodiments of the invention the detergent composition does not require a surfactant and/or other polymer in addition to the PSO derivatives. In alternative embodiments, the detergent compositions employ a nonionic surfactant to provide defoaming properties to the composition. In an embodiment, the detergent composition employs an alkoxylated surfactant (e.g. EO/PO copolymers).

Nonionic Surfactants

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates; capped alcohol alkoxylates; mixtures thereof, or the like.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Block polyoxypropylene-polyoxyethylene polymeric compounds based upon propylene glycol, ethylene glycol, glycerol, trimethylolpropane, and ethylenediamine as the initiator reactive hydrogen compound are suitable nonionic surfactants. Examples of polymeric compounds made from a sequential propoxylation and ethoxylation of initiator are commercially available under the trade names Pluronic® and Tetronic® manufactured by BASF Corp.

Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule.

Tetronic® compounds are tetra-functional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Semi-Polar Nonionic Surfactants

The semi-polar type of nonionic surface active agents are another class of nonionic surfactant useful in compositions of the present invention. Semi-polar nonionic surfactants include the amine oxides, phosphine oxides, sulfoxides and their alkoxylated derivatives.

Amine oxides are tertiary amine oxides corresponding to the general formula:

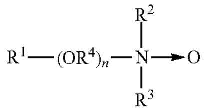

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide.

Useful semi-polar nonionic surfactants also include the water soluble phosphine oxides having the following structure:

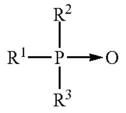

wherein the arrow is a conventional representation of a semi-polar bond; and, $R^1$ is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Semi-polar nonionic surfactants useful herein also include the water soluble sulfoxide compounds which have the structure:

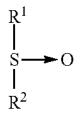

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms. Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Preferred semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Alkoxylated amines or, most particularly, alcohol alkoxylated/aminated/alkoxylated surfactants are also suitable for use according to the invention. These non-ionic surfactants may be at least in part represented by the general formulae: $R^{20}$—$(PO)_SN$—$(EO)_tH$, $R^{20}$—$(PO)_SN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants.

Anionic Surfactants

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

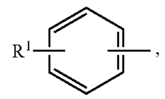

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

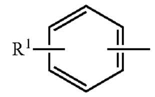

and $R^1$ is a $C_6$-$C_{12}$ alkyl group. In still yet other embodiments, $R^1$ is a $C^9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphino. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

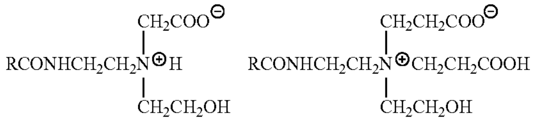

(MONO)ACETATE (DI)PROPIONATE

Neutral pH - Zwitterion

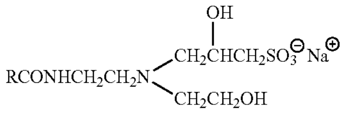

AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8{-}C_{18}$ straight or branched chain alkyl, fatty amines with halogenated carboxylic acids. Alkylation of the primary amino groups of an amino acid leads to secondary and tertiary amines Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na$)$_2$—$CH_2$—$CH_2$—OH or $C_{12}$-alkyl-C(O)—N(H)—$CH_2$—$CH_2$—$N^+$($CH_2$—$CO_2Na$)$_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J. A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch), which is herein incorporated by reference in its entirety.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y—and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution. The simplest cationic amines, amine salts and quaternary ammonium compounds can be schematically drawn thus:

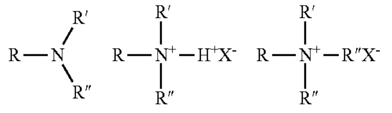

in which, R represents a long alkyl chain, R', R'', and R''' may be either long alkyl chains or smaller alkyl or aryl groups or hydrogen and X represents an anion. The amine salts and quaternary ammonium compounds are preferred for practical use in this invention due to their high degree of water solubility. The majority of large volume commercial cationic surfactants can be subdivided into four major classes and additional sub-groups known to those or skill in the art and described in "Surfactant Encyclopedia", Cosmetics & Toiletries, Vol. 104 (2) 86-96 (1989), which is herein incorporated by reference in its entirety. The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like. Cationic surfactants useful in the compositions of the present invention include those having the formula R1mR2xYLZ wherein each R1 is an organic group containing a straight or branched alkyl or alkenyl group optionally substituted with up to three phenyl or hydroxy groups and optionally interrupted by up to four of the following structures:

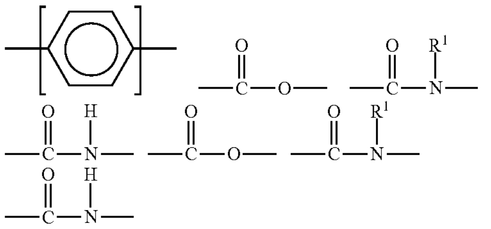

or an isomer or mixture of these structures, and which contains from about 8 to 22 carbon atoms. The R1 groups can additionally contain up to 12 ethoxy groups. m is a number from 1 to 3. Preferably, no more than one R1 group in a molecule has 16 or more carbon atoms when m is 2 or more than 12 carbon atoms when m is 3. Each R2 is an alkyl or hydroxyalkyl group containing from 1 to 4 carbon atoms or a benzyl group with no more than one R2 in a molecule being benzyl, and x is a number from 0 to 11, preferably from 0 to 6. The remainder of any carbon atom positions on the Y group are filled by hydrogens.

Y is can be a group including, but not limited to:

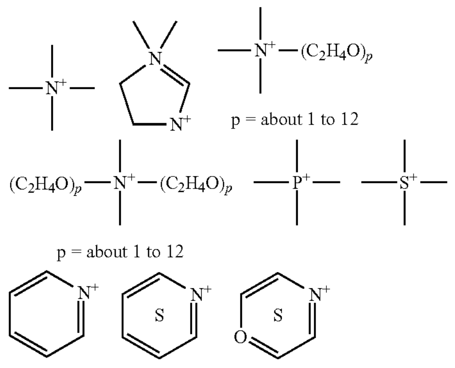

or a mixture thereof. Preferably, L is 1 or 2, with the Y groups being separated by a moiety selected from R1 and R2 analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

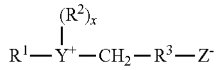

wherein R 1 contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-(N,N-dipropyl-N-3-dodecoxy-2-hydroxypropyl-ammonio)-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

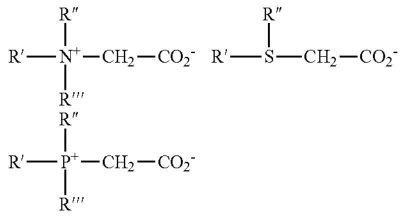

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2\ N^+\ R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678, which is herein incorporated by reference in its entirety. Further examples are given in "Surface Active Agents and Detergents" (Vol. I and II by Schwartz, Perry and Berch), which is herein incorporated by reference in its entirety.

Detergent Builders

The composition can include one or more building agents, also called chelating or sequestering agents (e.g., builders), including, but not limited to: condensed phosphates, alkali metal carbonates, phosphonates, aminocarboxylic acids, and/or polyacrylates. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight. If the solid composition is provided as a concentrate, the concentrate can include between approximately 1% to approximately 60% by weight, between approximately 3% to approximately 50% by weight, and between approximately 6% to approximately 45% by weight of the builders. Additional ranges of the builders include between approximately 3% to approximately 20% by weight, between approximately 6% to approximately 15% by weight, between approximately 25% to approximately 50% by weight, and between approximately 35% to approximately 45% by weight.

Examples of condensed phosphates include, but are not limited to: sodium and potassium orthophosphate, sodium and potassium pyrophosphate, sodium tripolyphosphate, and sodium hexametaphosphate. A condensed phosphate may also assist, to a limited extent, in solidification of the composition by fixing the free water present in the composition as water of hydration.

Examples of phosphonates include, but are not limited to: 2-phosphinobutane-1,2,4-tricarboxylic acid (PBTC), 1-hydroxyethane-1,1-diphosphonic acid, $CH_2C(OH)[PO(OH)_2]_2$; aminotri(methylenephosphonic acid), $N[CH_2PO(OH)_2]_3$; aminotri(methylenephosphonate), sodium salt (ATMP), $N[CH_2PO(ONa)_2]_3$; 2-hydroxyethyliminobis (methylenephosphonic acid), $HOCH_2CH_2\ N[CH_2PO(OH)_2]_2$; diethylenetriaminepenta(methylenephosphonic acid), $(HO)_2POCH_2\ N[CH_2\ CH_2N[CH_2\ PO(OH)_2]_2]_2$; diethylenetriaminepenta(methylenephosphonate), sodium salt (DTPMP), $C_9\ H_{(28-x)}\ N_3\ Na_xO_{15}\ P_5$ (x=7); hexamethylenediamine(tetramethylenephosphonate), potassium salt, $C_{10}H_{(28-x)}\ N_2K_x\ O_{12}\ P_4$ (x=6); bis(hexamethylene)triamine (pentamethylenephosphonic acid), $(HO_2)POCH_2\ N[CH_2)_2N[CH_2\ PO(OH)_2]_2]_2$; and phosphorus acid, $H_3PO_3$. Preferred phosphonates are PBTC, HEDP, ATMP and DTPMP. A neutralized or alkali phosphonate, or a combination of the phosphonate with an alkali source prior to being added into the mixture such that there is little or no heat or gas generated by a neutralization reaction when the phosphonate is added is preferred. In one embodiment, however, the composition is phosphorous-free.

Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), methylglycinediacetic acid (MGDA), glutamic acid-N,N-diacetic acid (GLDA), ethylenediaminesuccinic acid (EDDS), 2-hydroxyethyliminodiacetic acid (HEIDA), iminodisuccinic acid (IDS), 3-hydroxy-2-2'-iminodisuccinic acid (HIDS) and other similar acids or salts thereof having an amino group with a carboxylic acid substituent. In one embodiment, however, the composition is free of aminocarboxylates.

Formulations

The detergent compositions according to the invention may be formulated into solids, liquids, powders, pastes, gels, etc.

Solid detergent compositions provide certain commercial advantages for use according to the invention. For example, use of concentrated solid detergent compositions decrease shipment costs as a result of the compact solid form, in comparison to bulkier liquid products. In certain embodiments of the invention, solid products may be provided in the form of a multiple-use solid, such as, a block or a plurality of pellets, and can be repeatedly used to generate aqueous use solutions of the detergent composition for multiple cycles or a predetermined number of dispensing cycles. In certain embodiments, the solid detergent compositions may have a mass greater than about 5 grams, such as for example from about 5 grams to 10 kilograms. In certain embodiments, a multiple-use form of the solid detergent composition has a mass of about 1 kilogram to about 10 kilogram or greater.

Methods of Use

The compositions of the invention are suitable for use in various applications and methods, including any application suitable for an alkali metal hydroxide and/or alkali metal carbonate detergent. The methods of the invention are particularly suited for methods employing alkaline detergents in need of preventing hard water scale accumulation on surfaces. In addition, the methods of the invention are well suited for controlling water hardness buildup on a plurality of surfaces. The methods of the invention prevent moderate to heavy accumulation hardness on treated substrate surfaces beneficially improving the aesthetic appearance of the surface. In certain embodiments, surfaces in need of hard water scale accumulation prevention, include for example, plastics, metal and/or glass surfaces.

The methods of the invention beneficially reduce the formation, precipitation and/or deposition of hard water scale, such as calcium carbonate, on hard surfaces contacted by the detergent compositions. In an embodiment, the detergent compositions are employed for the prevention of formation, precipitation and/or deposition of hard water scale on articles such as glasses, plates, silverware, etc. The detergent compositions according to the invention beneficially provide such prevention of formation, precipitation and/or deposition of hard water scale despite the high alkalinity of the detergent composition use solutions in the presence of hard water.

Methods of use employing the detergent compositions according to the invention are particularly suitable for institutional ware washing. Exemplary disclosure of warewashing applications is set forth in U.S. Publication Nos. US 2012/00291815, US 2013/0146102, and US 2012/0291808, including all references cited therein, which are herein incorporated by reference in its entirety. The method may be carried out in any consumer or institutional dish machine, including for example those described in U.S. Pat. No. 8,092,613, which is incorporated herein by reference in its entirety, including all figures and drawings. Some non-limiting examples of dish machines include door machines or hood machines, conveyor machines, undercounter machines, glasswashers, flight machines, pot and pan machines, utensil washers, and consumer dish machines. The dish machines may be either single tank or multi-tank machines.

A door dish machine, also called a hood dish machine, refers to a commercial dish machine wherein the soiled dishes are placed on a rack and the rack is then moved into the dish machine. Door dish machines clean one or two racks at a time. In such machines, the rack is stationary and the wash and rinse arms move. A door machine includes two sets arms, a set of wash arms and a rinse arm, or a set of rinse arms.

Door machines may be a high temperature or low temperature machine. In a high temperature machine the dishes are sanitized by hot water. In a low temperature machine the dishes are sanitized by the chemical sanitizer. The door machine may either be a recirculation machine or a dump and fill machine. In a recirculation machine, the detergent solution is reused, or "recirculated" between wash cycles. The concentration of the detergent solution is adjusted between wash cycles so that an adequate concentration is maintained. In a dump and fill machine, the wash solution is not reused between wash cycles. New detergent solution is added before the next wash cycle. Some non-limiting examples of door machines include the Ecolab Omega HT, the Hobart AM-14, the Ecolab ES-2000, the Hobart LT-1, the CMA EVA-200, American Dish Service L-3DW and HT-25, the Autochlor A5, the Champion D-HB, and the Jackson Tempstar.

The detergent compositions are effective at preventing hard water scale accumulation in warewashing applications using a variety of water sources, including hard water. In addition, the detergent compositions are suitable for use at temperature ranges typically used in industrial warewashing applications, including for example from about 150° F. to about 165° F. during washing steps and from about 170° F. to about 185° F. during rinsing steps.

In addition, the methods of use of the detergent compositions are also suitable for CIP and/or COP processes to replace the use of bulk detergents leaving hard water residues on treated surfaces. The methods of use may be desirable in additional applications where industrial standards are focused on the quality of the treated surface, such that the prevention of hard water scale accumulation provided by the detergent compositions of the invention are desirable. Such applications may include, but are not limited to, vehicle care, industrial, hospital and textile care.

Additional examples of applications of use for the detergent compositions include, for example, alkaline detergents effective as grill and oven cleaners, ware wash detergents, laundry detergents, laundry presoaks, drain cleaners, hard surface cleaners, surgical instrument cleaners, transportation vehicle cleaning, vehicle cleaners, dish wash presoaks, dish wash detergents, beverage machine cleaners, concrete cleaners, building exterior cleaners, metal cleaners, floor finish strippers, degreasers and burned-on soil removers. In a variety of these applications, cleaning compositions having a very high alkalinity are most desirable and efficacious, however the damage caused by hard water scale accumulation is undesirable.

The various methods of use according to the invention employ the use of the detergent composition, which may be formed prior to or at the point of use by combining the PSO derivatives, alkalinity source and other desired components (e.g. optional polymers and/or surfactants) in the weight percentages disclosed herein. The detergent composition may be provided in various formulations. The methods of the invention may employ any of the formulations disclosed, including for example, liquids, semi-solids and/or other solid formulations.

The methods of the invention may also employ a concentrate and/or a use solution constituting an aqueous solution or dispersion of a concentrate. Such use solutions may be formed during the washing process such as during warewashing processes.

In aspects of the invention employing packaged solid detergent compositions, the products may first require removal from any applicable packaging (e.g. film). Thereafter, according to certain methods of use, the compositions can be inserted directly into a dispensing apparatus and/or provided to a water source for cleaning according to the invention. Examples of such dispensing systems include for example U.S. Pat. Nos. 4,826,661, 4,690,305, 4,687,121, 4,426,362 and U.S. Pat. Nos. Re 32,763 and 32,818, the disclosures of which are incorporated by reference herein in its entirety. Ideally, a solid detergent composition is configured or produced to closely fit the particular shape(s) of a dispensing system in order to prevent the introduction and dispensing of an incorrect solid product into the apparatus of the present invention.

In certain embodiments, the detergent composition may be mixed with a water source prior to or at the point of use. In other embodiments, the detergent compositions do not require the formation of a use solution and/or further dilution and may be used without further dilution.

In aspects of the invention employing solid detergent compositions, a water source contacts the detergent composition to convert solid detergent compositions, particularly powders, into use solutions. Additional dispensing systems may also be utilized which are more suited for converting alternative solid detergents compositions into use solutions. The methods of the present invention include use of a variety of solid detergent compositions, including, for example, extruded blocks or "capsule" types of package.

In an aspect, a dispenser may be employed to spray water (e.g. in a spray pattern from a nozzle) to form a detergent use solution. For example, water may be sprayed toward an apparatus or other holding reservoir with the detergent composition, wherein the water reacts with the solid detergent composition to form the use solution. In certain embodiments of the methods of the invention, a use solution may be configured to drip downwardly due to gravity until the dissolved solution of the detergent composition is dispensed for use according to the invention. In an aspect, the use solution may be dispensed into a wash solution of a ware wash machine.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Hard water film accumulation testing was conducted using a light box evaluation of 100 cycle glasses. The 100 cycle experiment was performed using six 10 oz. Libby glasses on a Hobart AM-15 ware wash machine employing 17 grain water (hard water source). Initially the glasses were prepared using a cleaning cycle to completely remove all film and foreign material from the glass surface.

The Example compositions shown in Table 1 were evaluated. The controls employed were a commercially-available etch-protection alkali metal detergent composition (Solid Power XL, available from Ecolab, Inc.) (Control 1) and a 75% caustic (sodium hydroxide)/25% water alkaline detergent (Control 2).

TABLE 1

| Raw material | Ex 1 | Ex 2 | Ex 3 | Ex 4 | Ex 5 | Ex 6 |
|---|---|---|---|---|---|---|
| Water | 12.7 | 18.5 | 14.3 | 14.3 | 14.3 | 13.6 |
| Sodium hydroxide (beads) | 69.1 | 71.6 | 69.8 | 69.8 | 69.8 | 69.1 |
| Pluronic N3: EP/PO copolymers | 0.9 | 0.9 | 0.9 | 0.9 | 0.9 | — |
| PSO derivatives | 17.3 | 9 | 5 | 7.5 | 10 | 17.3 |
| Acusol 445N (45%): polycarboxylic acid | — | — | 10 | 7.5 | 10 | — |

The ware wash machine controller was set to automatically dispense the indicated amount of detergent into the wash tank. Six clean glasses (G=glass tumblers) were placed in a Raburn rack (see FIG. 1) and the rack was placed inside the dishmachine.

The ware wash machine automatically dispensed into the ware wash machine the detergent compositions to achieve the desired concentration and maintain the initial concentration. The glasses were dried overnight and then the film accumulation using a strong light source was evaluated.

The light box test standardizes the evaluation of the glasses run in the 100 cycle test. The light box test is based on the use of an optical system including a photographic camera, a light box, a light source and a light meter. The system is controlled by a computer program (Spot Advance and Image Pro Plus). To evaluate the glasses after the 100 cycle test, each glass was placed on the light box resting on its side and the intensity of the light source was adjusted to a predetermined value using a light meter. The conditions of the 100 cycle test were entered into the computer. A picture of the glass was taken with the camera and saved on the computer for analysis by the program. The picture was analyzed using the upper half of the glass in order to avoid the gradient of darkness on the film from the top of the glass to the bottom of the glass, based on the shape of the glass.

Generally, a lower light box rating indicates that more light was able to pass through the glass. Thus, the lower the light box rating, the more effective the composition was at preventing scaling on the surface of the glass. Light box evaluation of a clean, unused glass has a light box score of approximately 12,000 which corresponds to a score of 72,000 for the sum of 6 glasses. Table 2 shows the results of the light box test.

TABLE 2

| Example | Use Concentration | Light Box Scores Glasses | Plastic | Sum |
|---|---|---|---|---|
| Control 1 | 750 ppm | 147284 | 30191 | 177475 |
| Control 2 | 666 ppm | 393210 | 65535 | 458745 |
| Example 1 | 723 ppm | 147310 | 34076 | 181386 |
| Example 2 | 698 ppm | 215180 | 38272 | 253452 |

TABLE 2-continued

| Example | Use Concentration | Light Box Scores Glasses | Plastic | Sum |
|---|---|---|---|---|
| Example 3 | 716 ppm | 202346 | 33122 | 235468 |
| Example 4 | 716 ppm | 246853 | 36741 | 283594 |
| Example 5 | 716 ppm | 170870 | 37571 | 208441 |
| Example 6 | 723 ppm | 116262 | 64514 | 180776 |

The results demonstrate that the Examples 1-5 according to the invention combining a PSO derivative and alkali metal source of alkalinity had significantly better light box scores than the Control 2 formulation. In addition, according to the invention as shown in Example 6, the formulations of the detergent compositions do not require the inclusion of any additional surfactant and/or polymers.

Example 2

The cleaning efficacy of the detergent compositions according to the invention was evaluated using a 7 cycle soil removal and antiredeposition experiment. The Example composition shown in Table 3 was evaluated against a commercially-available control (Solid Power XL, available from Ecolab, Inc.).

TABLE 3

| Raw material | Ex 7 |
|---|---|
| Water | 10-20 |
| Sodium hydroxide (beads) | 50-70 |
| PSO derivatives (40%) | 5-20 |
| Etch Protection | 0.1-5 |
| Nonionic Surfactant(s) | 0-5 |
| Bleach | 0-5 |
| Dye | 0-1 |
| Fragrance | 0-2 |
| Fillers/Additional Functional Ingredients | 0-15 |

To test the ability of compositions to clean glass and plastic, twelve 10 oz. Libby heat resistant glass tumblers and four plastic tumblers were used. The glass tumblers were cleaned prior to use. New plastic tumblers were used for each experiment.

A food soil solution was prepared using a 50/50 combination of beef stew and hot point soil. The soil included two cans of Dinty Moore Beef Stew (1360 grams), one large can of tomato sauce (822 grams), 15.5 sticks of Blue Bonnet Margarine (1746 grams) and powered milk (436.4 grams).

After filling the dishmachine with 17 grain water, the heaters were turned on. The final rinse temperature was adjusted to about 180° F. The glasses and plastic tumblers were soiled by rolling the glasses in a 1:1 (by volume) mixture of Campbell's Cream of Chicken Soup: Kemp's Whole Milk three times. The glasses were then placed in an oven at about 160° F. for about 8 minutes. While the glasses were drying, the dishmachine was primed with about 120 grams of the food soil solution, which corresponds to about 2000 ppm of food soil in the sump.

Figure 2:
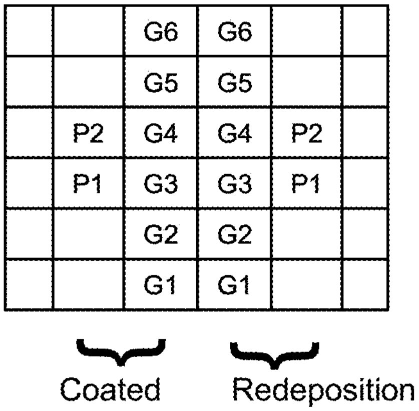
FIG. 2 shows the arrangement of ware in a Raburn rack inside a dishmachine as employed in Example 2.

The soiled glass and plastic tumblers were placed in the Raburn rack (see FIG. 2 for arrangement; P=plastic tumbler; G=glass tumbler) and the rack was placed inside the dishmachine. The first two columns with the tumblers were tested for soil removal while the second two columns with the tumblers were tested for redeposition.

The dishmachine was then started and run through an automatic cycle. When the cycle ended, the top of the glass and plastic tumblers were mopped with a dry towel. The glass and plastic tumblers being tested for soil removal were removed and the soup/milk soiling procedure was repeated. The redeposition glass and plastic tumblers were not removed. At the beginning of each cycle, an appropriate amount of detergent and food soil were added to the wash tank to make up for the rinse dilution. The soiling and washing steps were repeated for seven cycles.

The glass and plastic tumblers were then graded for protein accumulation using Commassie Brilliant Blue R stain followed by destaining with an aqueous acetic acid/methanol solution. The Commassie Brilliant Blue R stain was prepared by combining 1.25 g of Commassie Brilliant Blue R dye with 45 mL of acetic acid and 455 mL of 50% methanol in distilled water. The destaining solution consisted of 45% methanol and 10% acetic acid in distilled water. The amount of protein remaining on the glass and plastic tumblers after destaining was rated visually on a scale of 1 to 5. A rating of 1 indicated no protein was present after destaining A rating of 2 indicated that random areas (barely perceptible) were covered with protein after destaining A rating of 3 indicated that about a quarter to half of the surface was covered with protein after destaining A rating of 4 indicated that about half to three quarters of the glass/plastic surface was covered with protein after destaining A rating of 5 indicated that the entire surface was coated with protein after destaining The ratings of the glass tumblers tested for soil removal were averaged to determine an average soil removal rating from glass surfaces and the ratings of the plastic tumblers tested for soil removal were averaged to determine an average soil removal rating from plastic surfaces Similarly, the ratings of the glass tumblers tested for redeposition were averaged to determine an average redeposition rating for glass surfaces and the ratings of the plastic tumblers tested for redeposition were averaged to determine an average redeposition rating for plastic surfaces.

The results are shown in Tables 4A and 4B, demonstrating that the detergent compositions according to the invention provide at least substantially similar cleaning efficacy and in various embodiments provide superior efficacy over commercial products.

TABLE 4A

| Coated Glasses | G1 | G2 | G3 | G4 | G5 | G6 | P1 | P2 | SUM |
|---|---|---|---|---|---|---|---|---|---|
| Control | 1 | 1.5 | 1 | 1 | 1 | 1 | 2 | 2 | 10.5 |
| EX 7 | 1 | 1 | 1.5 | 1 | 1 | 1 | 2 | 2 | 10.5 |

TABLE 4B

| Redeposition Glasses | G1 | G2 | G3 | G4 | G5 | G6 | P1 | P2 | SUM |
|---|---|---|---|---|---|---|---|---|---|
| Control | 1 | 1 | 1 | 1 | 1 | 1 | 2 | 2 | 10 |
| EX 7 | 1 | 1 | 1 | 1 | 1 | 1 | 2 | 2 | 10 |

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A detergent use solution composition comprising:

a phosphinosuccinic acid derivative, wherein the phosphinosuccinic acid derivative is a combination of phosphinosuccinic acid and mono-, bis-and oligomeric phosphinosuccinic acid adducts; and from about 100 ppm to about 1500 ppm of an alkalinity source comprising an alkali metal hydroxide, carbonate, metasilicate, and/or silicate, wherein the detergent use solution composition has a pH greater than about 9, and does not contain a bleaching agent.

2. The composition of claim 1, further comprising a water soluble polymer.

3. The composition of claim 2, wherein the water soluble polymer is selected from the group consisting of a polycarboxylic acid and hydrophobically modified polycarboxylic acid.

4. The composition of claim 1, further comprising a nonionic surfactant.

5. The composition of claim 4, wherein the nonionic surfactant comprises ethylene oxide, propylene oxide, or a combination of ethylene oxide and propylene oxide.

6. The composition of claim 1, wherein the phosphinosuccinic acid derivative comprises at least 10 mol % of an adduct comprising a ratio of succinic acid to phosphorus from about 1:1 to 20:1.

7. The composition of claim 1, wherein the phosphinosuccinic acid (I) and mono-(II), bis-(III) and oligomeric (IV) phosphinosuccinic acid adducts have the following formulas:

(I)

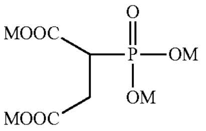

(II)

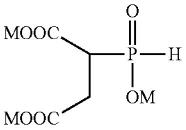

(III)

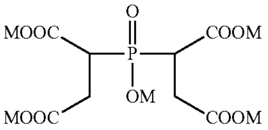

(IV)

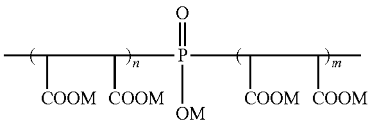

where M is selected from the group consisting of $H^+$, $Na^+$, $K^+$, $NH_4^+$, and mixtures thereof, wherein m plus n is greater than 2.

8. The composition of claim 1, wherein the use solution comprises from about 1-500 ppm of the phosphinosuccinic acid derivative and has a pH between about 9 and 12.5.

9. A detergent use solution composition comprising:

a phosphinosuccinic acid derivative, wherein the phosphinosuccinic acid derivative is a combination of phosphinosuccinic acid and mono-, bis-and oligomeric phosphinosuccinic acid adducts;

from about 100 ppm to about 1500 ppm of an alkalinity source comprising an alkali metal hydroxide, carbonate, metasilicate, and/or silicate; and a surfactant, wherein the detergent use solution composition has a pH greater than about 9, and does not contain a bleaching agent.

10. The composition of claim 9, wherein the surfactant is a nonionic surfactant.

11. The composition of claim 10, wherein the nonionic surfactant comprises ethylene oxide, propylene oxide and combinations of ethylene oxide and propylene oxide.

12. The composition of claim 9, wherein the phosphinosuccinic acid (I) and mono-(II), bis-(III) and oligomeric (IV) phosphinosuccinic acid adducts have the following formulas:

(I)

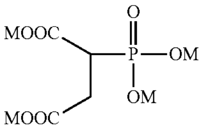

(II)

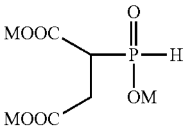

(III)

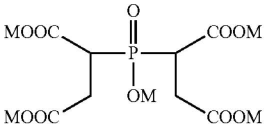

(IV)

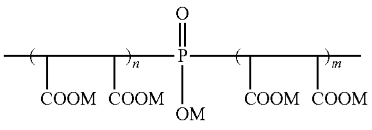

where M is selected from the group consisting of $H^+$, $Na^+$, $K^+$, $NH_4^+$, and mixtures thereof, wherein m plus n is greater than 2.

13. The composition of claim 9, wherein the composition further comprises a builder.

14. The composition of claim 9, wherein the composition comprises from about 1-500 ppm of the phosphinosuccinic acid derivative, from about 1-50 ppm of the surfactant, and has a pH of between about 9 and 12.5.

15. The composition of claim 9, wherein the phosphinosuccinic acid derivative comprises at least 10 mol % of an adduct comprising a ratio of succinic acid to phosphorus from about 1:1 to 20:1.

16. A method of cleaning while preventing hard water scale accumulation on a treated surface comprising:

applying a detergent use solution composition according to claim 1 to a substrate surface, wherein the composition is effective for preventing the formation, precipitation and/or deposition of hard water scale on the surface.

17. The method of claim 16, wherein the surface is a plastic, metal and/or glass surface.

18. The method of claim 16, wherein the detergent use solution is generated within a ware washing machine.

19. The method of claim 16, wherein the detergent use solution has a pH between about 9 and 12.5.

* * * * *